(12) United States Patent
Hou et al.

(10) Patent No.: US 12,035,697 B2
(45) Date of Patent: Jul. 16, 2024

(54) BENTHONIC ANIMAL ISOLATION FRAME AND METHOD FOR STUDYING AQUATIC ECOSYSTEM BY USING SAME

(71) Applicant: FRESHWATER FISHERIES RESEARCH CENTER,CAFS, Wuxi (CN)

(72) Inventors: Yiran Hou, Wuxi (CN); Jian Zhu, Wuxi (CN); Bing Li, Wuxi (CN); Rui Jia, Wuxi (CN); Wei Sun, Wuxi (CN)

(73) Assignee: FRESHWATER FISHERIES RESEARCH CENTER, CAFS, Wuxi (CN)

(*) Notice: Subject to any disclaimer, the term of this patent is extended or adjusted under 35 U.S.C. 154(b) by 0 days.

(21) Appl. No.: 18/198,290

(22) Filed: May 17, 2023

(65) Prior Publication Data

US 2023/0371478 A1 Nov. 23, 2023

(30) Foreign Application Priority Data

May 20, 2022 (CN) .......................... 202210549170.X

(51) Int. Cl.
*A01K 61/00* (2017.01)
*A01K 61/80* (2017.01)
*A01K 63/00* (2017.01)
*C02F 3/00* (2023.01)

(52) U.S. Cl.
CPC .............. *A01K 61/00* (2013.01); *A01K 61/80* (2017.01); *A01K 63/00* (2013.01); *C02F 3/00* (2013.01)

(58) Field of Classification Search
None
See application file for complete search history.

(56) References Cited

U.S. PATENT DOCUMENTS

| 4,226,210 A | * | 10/1980 | Lockwood | A01K 61/00 119/4 |
| 2018/0153143 A1 | * | 6/2018 | Barber | A01K 61/70 |
| 2020/0060243 A1 | * | 2/2020 | Lawrence | A01K 61/73 |

FOREIGN PATENT DOCUMENTS

| CN | 103039389 A | 4/2013 |
| CN | 110419479 A | 11/2019 |
| CN | 110510838 A | 11/2019 |
| CN | 210352743 U | 4/2020 |
| CN | 214962007 U | 12/2021 |
| WO | 2017204669 A1 | 11/2017 |

* cited by examiner

*Primary Examiner* — Joshua J Michener
*Assistant Examiner* — Henry Hooper Mudd
(74) *Attorney, Agent, or Firm* — Bayramoglu Law Offices LLC

(57) ABSTRACT

A benthonic animal isolation frame and a method for studying an aquatic ecosystem by using the same is provided. The benthonic animal isolation frame includes side surfaces and a bottom surface of the isolation frame as hollow structures. Joints of the side surfaces and the bottom surface are provided with clamping grooves. The bottom surface is provided with a filter membrane; and the filter membrane is fixed on the bottom surface through the clamping grooves. The benthonic animal isolation frame can be used for easily studying the influence of the benthonic animal and excrement thereof on a water body ecological system.

14 Claims, 2 Drawing Sheets

BENTHONIC ANIMAL ISOLATION FRAME AND METHOD FOR STUDYING AQUATIC ECOSYSTEM BY USING SAME

CROSS REFERENCE TO RELATED APPLICATIONS

This application is based upon and claims priority to Chinese Patent Application No. 202210549170.X filed May 20, 2022, the entire contents of which are incorporated by reference herein.

TECHNICAL FIELD

The present invention relates to the technical field of studying large benthonic animal bioturbation behavior, and in particular to a benthonic animal isolation frame and a method for studying an aquatic ecosystem by using the same.

BACKGROUND

Benthonic animals refer to aquatic fauna living at a bottom of a water body for all or most of their life cycles. As secondary consumers, they are an important part of an aquatic ecosystem, especially a sediment-water interface. Benthonic animals can be classified into large benthonic animals, small benthonic animals, and micro benthonic animals according to their body size. Benthonic animals are not only natural baits for aquatic economic animals but also important environment monitoring and indicating organisms. In particular, large benthonic animals can change the physicochemical properties and the structure of sediment, accelerate the material exchange at the sediment-water interface, influence the biogeochemical cycle process at the sediment-water interface, change the structure and evolution of benthonic organism communities, and the like through bioturbation such as feeding, moving, building tubes, avoiding enemies, excreting, burrowing, and the like. Therefore, observing bioturbation behaviors of the benthonic animal and quantifying the influence of the bioturbation behaviors on the sediment-water interface microenvironment are particularly important for the study of the aquatic ecosystem.

However, the study apparatus used in the prior art has a main defect that it is impossible to effectively distinguish the influence of typical behaviors such as feeding, exercising, building tubes, avoiding enemies, excreting, and burrowing on the microenvironment at the sediment-water interface. All behaviors can only be studied as a whole, which poses a great obstacle to an in-depth understanding of the ecological mechanism by which benthonic animals influence the microenvironment at the sediment-water interface. The excrement generated by excretion does not cause displacement of sediment in a horizontal or vertical direction, but realizes material conversion through the self-digestion process of organisms, and this behavior is remarkably different from the behavior of feeding, exercising, burrowing and the like which can cause the displacement of sediment in the horizontal or vertical direction, so the excrement is extremely valuable for distinguishing and studying. Meanwhile, the existence of benthonic animals has a certain influence on the microenvironment, that is, in addition to the change of physicochemical properties caused by the bioturbation behaviors, and the existence of the benthonic animals in the system influences the structure of the environmental microbial community, so that it is very important to distinguish the typical behaviors of benthonic animals from the influence of their presence on the sediment-water interface for the study of benthonic animals.

SUMMARY

In order to achieve the above objective, the present invention provides the following technical solutions.

The present invention provides a benthonic animal isolation frame, wherein side surfaces and a bottom surface of the benthonic animal isolation frame are of hollow structures;

joints of the side surfaces and the bottom surface are provided with clamping grooves;

the bottom surface is provided with a filter membrane; and the filter membrane is fixed on the bottom surface through the clamping grooves.

Preferably, hollow holes of the hollow structure have a diameter of 2-5 mm.

Preferably, the filter membrane is a glass fiber filter membrane having a pore size of 3-7 μm.

Preferably, the isolation frame further comprises a pulling member connected to a top end of the isolation frame.

Preferably, the pulling member comprises a cross bar, a first connecting rod, a pull ring, and a second connecting rod;

the first connecting rod is connected to an intersection point of the pull ring and the cross bar; and the second connecting rod is connected to a tail end of the cross bar and a top end of a frame body.

The present invention further provides a method for studying an aquatic ecosystem by using a benthonic animal isolation frame, which comprises the following steps:

(1) laying sediment at a bottom of a culture tank, placing the benthonic animal isolation frame on the sediment, and attaching the benthonic animal isolation frame to the culture tank;

(2) in an experimental group, placing a benthonic animal in the benthonic animal isolation frame, taking the benthonic animal isolation frame and the benthonic animal out to feed when the animal is fed, and placing the benthonic animal in the culture tank after the feeding is completed;

(3) in the experimental process, removing excrement generated by the benthonic animal;

(4) in the experiment process, taking a culture tank provided with sediment as a blank group, taking a culture tank provided with sediment and a benthonic animal isolation frame as a control group 1, taking a culture tank provided with sediment and fed with feed as a control group 2, and taking a culture tank provided with sediment and the step (3) in which the generated excrement is removed an experimental group 2;

(5) after the experiment is completed, taking the sediment and water body samples of the experimental group 1, the blank group and the control group 1, and measuring an oxidation-reduction potential of the sediment, an ammonia nitrogen content, a nitrate nitrogen content and a nitrite nitrogen content of the water bodies; taking the sediment and water body samples of the control group 2 and the experimental group 2, and measuring an oxidation-reduction potential and a total organic matter content of the sediment, an ammonia nitrogen content and a nitrate nitrogen content of the water body;

(6) determining an influence of the benthonic animal on the aquatic ecosystem according to changes in the oxidation-reduction potential of the sediment and the ammonia nitrogen content, the nitrate nitrogen content and the nitrite nitrogen content of the water body among the experimental group 1, the blank group and the control group 1, and determining an influence of the benthonic animal excrement on the aquatic ecosystem according to changes in the oxidation-reduction potential and the total organic matter content of the sediment and the ammonia nitrogen content and the nitrate nitrogen content of the water body between the experimental group 2 and the control group 2.

Preferably, the sediment has a laying thickness of 4-6 cm.

Preferably, the sediment is taken from a bottom of a pond, dried, crushed and sieved through a sieve of 80-120 meshes.

Preferably, the benthonic animal is one of snail *Bellamya purificata*, snail *Bellamya aeruginosa*, snail *Sinotaia quadrata*, crayfish *Procambarus clarkii*, and shrimp *Macrobrachium nipponense*.

Preferably, a period of the experiment is 11-13 weeks.

The benthonic animal isolation frame provided by the present invention can isolate the benthonic animal and excrement thereof, and has the advantages of simple structure and convenience in operation. The influence of the benthonic animal and excretion thereof on the water body ecological system is studied by using the isolation frame, so that the study result can be accurately and conveniently obtained. The present invention provides a new method and a new idea for studying the influence of the benthonic animal and typical behaviors thereof on the sediment-water interface.

wherein 1-isolation frame, 11-side surface, 12-bottom surface, 13-clamping groove, 14-filter membrane, 15-hollow hole, 2-pulling member, 21-cross bar, 22-first connecting rod, 23-pull ring, and 24-second connecting rod.

Figure 2:
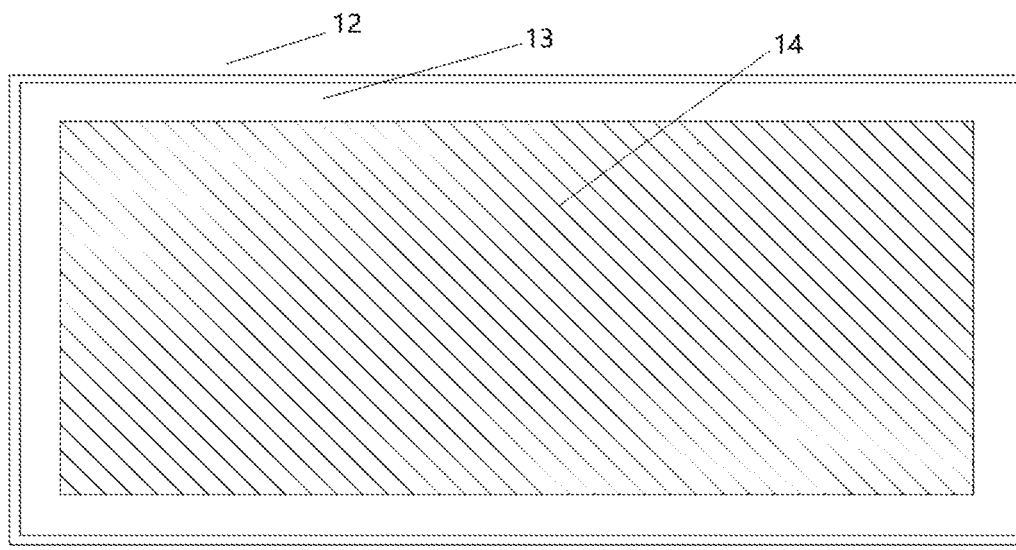

FIG. 2 is a top schematic view of a bottom of the benthonic animal isolation frame according to Example 1;

wherein 12-bottom surface, 13-clamping groove, and 14-filter membrane.

Figure 3:
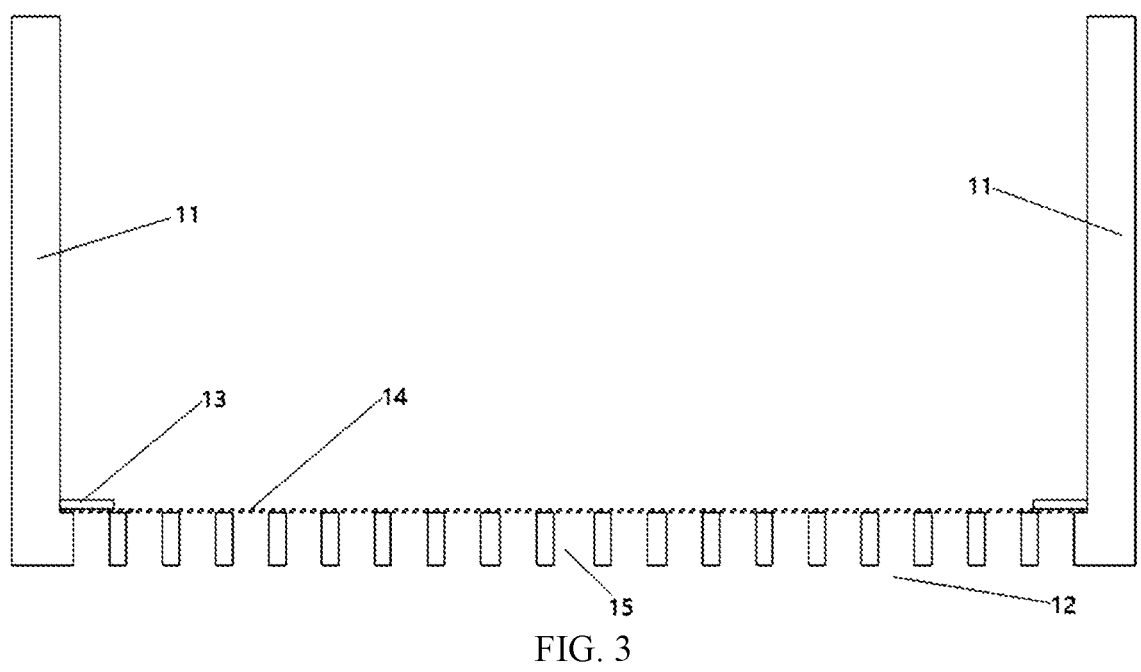

FIG. 3 is a schematic cross-sectional diagram of the benthonic animal isolation frame according to Example 1;

wherein 11-side surface, 12-bottom surface, 13-clamping groove, 14-filter membrane, and 15-hollow hole.

DETAILED DESCRIPTION OF THE EMBODIMENTS

The technical solutions provided by the present invention will be described in detail below with reference to the examples, which, however, should not be construed as limiting the scope of the present invention.

Example 1

Figure 1:
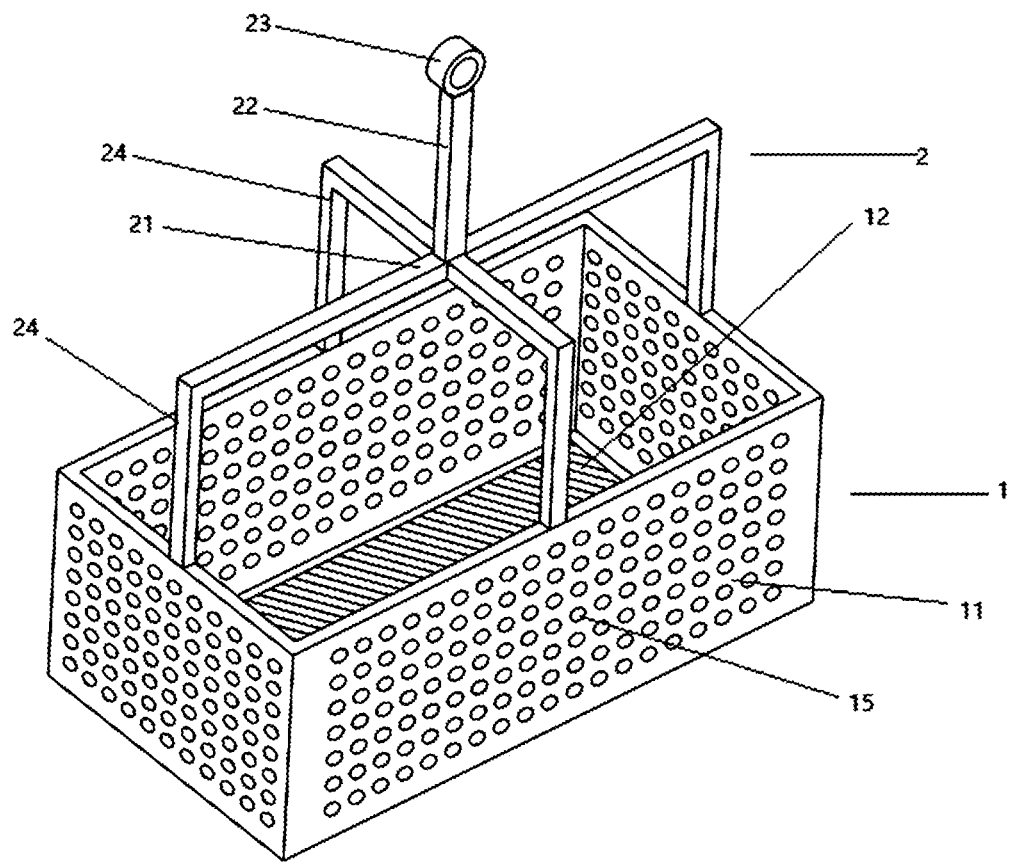
FIG. 1 is a schematic diagram of a benthonic animal isolation frame according to Example 1.

The rectangular benthonic animal isolation frame provided by this example is shown in FIGS. 1-3, wherein side surfaces 11 and a bottom surface 12 of the isolation frame 1 are of hollow structures; joints of the side surfaces 11 and the bottom surface 12 are provided with clamping grooves 13; the bottom surface is provided with a filter membrane 14; and the filter membrane 14 is fixed on the bottom surface 12 through the clamping grooves 13. The hollow structure is provided with hollow holes 15, and the diameter of the hollow holes 15 is 4 mm. The filter membrane 14 is a glass fiber filter membrane having a pore size of 5 μm.

The isolation frame 1 further comprises a pulling member 2, and the pulling member 2 is connected to a top end of the isolation frame 1. The pulling member comprises a cross bar 21, a first connecting rod 22, a pull ring 23, and a second connecting rod 24; the first connecting rod 22 is connected to an intersection point of the pull ring 23 and the cross bar 21; and the second connecting rod 24 is connected to a tail end of the cross bar 21 and a top end of a frame body.

Example 2

This example provides a method for studying influence of the benthonic animal and excrement thereof on an aquatic ecosystem by using the benthonic animal isolation frame provided in Example 1.

The culture tank of this example further comprises a water inlet and a water outlet, and is also provided with auxiliary devices such as air stones, an air flow control valve, air pipes, and water pipes which are used for water exchange and ventilation. The water inlet is also wrapped with a 200-mesh bolting-silk bag to avoid the invasion of phytoplankton carried by the water body in the water inlet process.

The benthonic animal used in this example is snail *Bellamya purificata*. Before the start of the experiment, the snail *Bellamya purificata* were bred in a glass tank laid with 5 cm of sediment for 14 days to adapt to the experiment environment.

The sediment used in this example was taken from a bottom of an aquaculture pond and was dried and sieved through a 100 mesh sieve to ensure the uniformity and consistency of the sediment and to prevent experimental errors caused by uneven distribution of the original components in the sediment.

The experimental water was fully aerated in advance, and the water temperature was kept at (25±0.5) ° C.

5 culture systems were set up in the experiment, and 3 replicates were set up for each culture system to ensure the scientificity and accuracy of the experiment. In these culture systems:

System No. 1: sediment with a thickness of 5 cm was laid in a culture tank, then the isolation frame of Example 1 was placed in the culture tank, and the isolation frame was just attached to the culture tank. The snail *Bellamya purificata* was placed in the isolation frame, and the snail *Bellamya purificata* is stocked at a density of 262.82 g/m$^2$. The System No. 1 is served as an experimental group 1.

System No. 2: sediment with a thickness of 5 cm was laid in a culture tank, then the isolation frame of Example 1 was placed in the culture tank, and the isolation frame was just attached to the culture tank. No snail *Bellamya purificata* was placed in the isolation frame, which served as a control group 1.

System No. 3: sediment with a thickness of 5 cm was laid in a culture tank, and no isolation frame and no snail *Bellamya purificata* were placed in the culture tank, which served as a blank group.

The experimental period was 12 weeks for 72 days. After the start of the experiment, at 16:00 every day, the benthonic animal isolation frame in system No. 1 (including benthonic animal of snail *Bellamya purificata*) was lifted and placed into a spare glass tank of the same specification for temporary storage, and during the temporary storage period, commercial feed was fed to the snail *Bellamya purificata*, so that the normal life activities of the snail *Bellamya purificata* can be guaranteed during the experiment period. The feed feeding amount was 2% of the total weight of the snail *Bellamya purificata*, and after the feeding of the snail *Bellamya purificata* was completed, the benthonic animal isolation frame was lifted from the temporary storage glass tank and then placed into the experimental system No. 1 again. When the isolation frame in system No. 1 was lifted, the isolation frame in system No. 2 was also lifted and placed into a spare glass tank of the same specification for temporary storage, however, no feed was fed, and the isolation frame in system No. 2 and the isolation frame in system No. 1 were placed in the culture tank. System No. 3 had no isolation frame and no benthonic animal, so the operation of lifting the isolation frame was not performed, and the feed was not fed.

In the experimental process, the excrement excretion condition of the snail *Bellamya purificata* was observed, and the excrement excreted by the snail *Bellamya purificata* was removed in time in a mode of lifting the benthonic animal isolation frame and disassembling the filter membrane.

System No. 4: sediment with a thickness of 5 cm was laid in a culture tank, and no isolation frame was placed, however, equivalent commercial feed was placed in based on system No. 1. The System No. 4 is served as an control group 2.

No. 5 system: sediment with a thickness of 5 cm was laid in a culture tank, no isolation frame was placed, and no feed was fed, however, the excrement excreted by the snail *Bellamya purificata* which was removed in the isolation frame from system No. 1 was placed therein. The System No. 5 is served as an experimental group 2.

After the experiment (day 72), the water body and sediment samples were collected, and the oxidation-reduction potential of the sediment samples and the contents of the ammonia nitrogen, nitrate nitrogen and nitrite nitrogen of the water body sample in systems No. 1-3 were measured for observing the influence of the snail *Bellamya purificata* on an aquatic ecosystem. The oxidation-reduction potential and a total organic matter content of the sediment samples and the contents of the ammonia nitrogen and nitrate nitrogen of the water body samples in systems No. 4-5 were measured for observing the influence of the snail *Bellamya purificata* excrement on an aquatic ecosystem. The results are shown in Tables 1 and 2.

TABLE 1

Influence of snail *Bellamya purificata* on the aquatic ecosystem

| Sample class | Measurement index | Experiment system | Index value |
| --- | --- | --- | --- |
| Sediment sample | Oxidation-reduction potential (mV) | No. 1 | −170.32 |
| | | No. 2 | −150.42 |
| | | No. 3 | −145.67 |
| Water body sample | Ammonia nitrogen (mg/L) | No. 1 | 0.91 ± 0.04 |
| | | No. 2 | 0.37 ± 0.08 |
| | | No. 3 | 0.39 ± 0.10 |
| | Nitrate nitrogen (mg/L) | No. 1 | 4.62 ± 0.41 |
| | | No. 2 | 2.01 ± 0.35 |
| | | No. 3 | 2.22 ± 0.27 |
| | Nitrite nitrogen (mg/L) | No. 1 | 0.93 ± 0.25 |
| | | No. 2 | 0.11 ± 0.02 |
| | | No. 3 | 0.14 ± 0.10 |

It can be seen from Table 1, in system No. 1, the oxidation-reduction potential of sediment is significantly lower than that of the other two systems, and the contents of the ammonia nitrogen, the nitrate nitrogen and the nitrite nitrogen of the water body are significantly higher than those of the other two systems. The result shows that the existence of the snail *Bellamya purificata* can effectively reduce the oxidation-reduction potential of the sediment, and significantly improve the contents of ammonia nitrogen, nitrate nitrogen and nitrite nitrogen of the water body.

TABLE 2

Influence of snail *Bellamya purificata* excretory behaviour and its excrement on the aquatic ecosystem

| Sample class | Measurement index | Experiment system | Index value |
| --- | --- | --- | --- |
| Sediment sample | Oxidation-reduction potential | No. 4 | −186.78 |
| | | No. 5 | −159.34 |
| | Total organic matter | No. 4 | 4.21% |
| | | No. 5 | 3.56% |
| Water body sample | Ammonia nitrogen (mg/L) | No. 4 | 0.41 ± 0.08 |
| | | No. 5 | 0.51 ± 0.12 |
| | Nitrate nitrogen (mg/L) | No. 4 | 1.75 ± 0.32 |
| | | No. 5 | 1.99 ± 0.48 |

It can be seen from Table 2, in system No. 4, the oxidation-reduction potential of the sediment is significantly lower than that of system No. 5, the total organic matter is significantly higher than that of system No. 5, and the contents of ammonia nitrogen and nitrate nitrogen in the water body in system No. 4 are significantly lower than those of system No. 5. The results show that the snail *Bellamya purificata* can reduce the content of organic matter in the substrate after ingesting bait, then converting the bait into excrement and discharging the excrement, and can promote the degradation of the organic matter to generate soluble nutritive salts such as ammonia nitrogen and nitrate nitrogen, so that the contents of the ammonia nitrogen and the nitrate nitrogen in the water body are improved.

According to the above example, the present invention provides a benthonic animal isolation frame, and the benthonic animal isolation frame can be used for easily studying the influence of the benthonic animal and excrement thereof on a water body ecological system.

The above descriptions are only preferred examples of the present invention. It should be noted that those of ordinary skill in the art can also make several improvements and modifications without departing from the principle of the present invention, and such improvements and modifications shall fall within the protection scope of the present invention.

What is claimed is:

1. A method for studying an aquatic ecosystem by using a benthonic animal isolation frame, comprising the following steps:
   (1) laying sediment at a bottom of a culture tank, placing the benthonic animal isolation frame on the sediment, and attaching the benthonic animal isolation frame to the culture tank;
   (2) in an experimental process, placing a benthonic animal in the benthonic animal isolation frame, taking the benthonic animal isolation frame and the benthonic animal out of the culture tank to feed while the animal is fed, and placing the benthonic animal in the culture tank after the feeding is completed;
   (3) in the experimental process, removing excrement generated by the benthonic animal;
   (4) in the experiment process, providing a culture tank provided with sediment as a blank group, providing a culture tank provided with sediment and a benthonic animal isolation frame as a control group 1, providing a culture tank provided with sediment and fed with feed as a control group 2, and providing a culture tank provided with sediment and the step (3) in which the generated excrement is removed as experimental group 1, providing a culture tank provided with sediment and the excrement removed in the benthonic animal isolation frame from experimental group 1 as experimental group 2;

(5) after the experimental process is completed, taking the sediment and water body samples of the experimental group 1, the blank group and the control group 1, and measuring an oxidation-reduction potential of the sediment, an ammonia nitrogen content, a nitrate nitrogen content and a nitrite nitrogen content of the water bodies; taking the sediment and water body samples of the control group 2 and the experimental group 2, and measuring an oxidation-reduction potential and a total organic matter content of the sediment, an ammonia nitrogen content and a nitrate nitrogen content of the water body;

(6) determining an influence of the benthonic animal on the aquatic ecosystem according to changes in the oxidation-reduction potential of the sediment and the ammonia nitrogen content, the nitrate nitrogen content and the nitrite nitrogen content of the water body among the experimental group 1, the blank group and the control group 1, and determining an influence of the benthonic animal excrement on the aquatic ecosystem according to changes in the oxidation-reduction potential and the total organic matter content of the sediment and the ammonia nitrogen content and the nitrate nitrogen content of the water body between the experimental group 2 and the control group 2; wherein side surfaces and a bottom surface of the benthonic animal isolation frame are of hollow structures;

joints of the side surfaces and the bottom surface are provided with clamping grooves;

the bottom surface is provided with a filter membrane; and the filter membrane is fixed on the bottom surface through the clamping grooves.

2. The method according to claim 1, wherein the sediment in each culture tank has a laying thickness of 4-6 cm.

3. The method according to claim 2, wherein the sediment is taken from a bottom of a pond, dried, crushed and sieved through a sieve of 80-120 meshes.

4. The method according to claim 3, wherein the benthonic animal is selected from the group consisting of snail *Bellamya purificata*, snail *Bellamya aeruginosa*, snail *Sinotaia quadrata*, crayfish *Procambarus clarkii*, and shrimp *Macrobrachium nipponense*.

5. The method according to claim 1, wherein a period of the experiment is 11-13 weeks.

6. The method according to claim 1, wherein hollow holes of the hollow structure have a diameter of 2-5 mm.

7. The method according to claim 6, wherein the filter membrane is a glass fiber filter membrane having a pore size of 3-7 μm.

8. The method according to claim 6, wherein the isolation frame further comprises a pulling member connected to a top end of the isolation frame.

9. The method according to claim 8, wherein the pulling member comprises a cross bar, a first connecting rod, a pull ring, and a second connecting rod;

the first connecting rod is connected to an intersection point of the pull ring and the cross bar; and the second connecting rod is connected to a tail end of the cross bar and a top end of a frame body.

10. The method according to claim 2, wherein a period of the experiment is 11-13 weeks.

11. The method according to claim 3, wherein a period of the experiment is 11-13 weeks.

12. The method according to claim 4, wherein a period of the experiment is 11-13 weeks.

13. The method according to claim 7, wherein the isolation frame further comprises a pulling member connected to a top end of the isolation frame.

14. The method according to claim 13, wherein the pulling member comprises a cross bar, a first connecting rod, a pull ring, and a second connecting rod;

the first connecting rod is connected to an intersection point of the pull ring and the cross bar; and the second connecting rod is connected to a tail end of the cross bar and a top end of a frame body.

* * * * *